(No Model.)

D. HILL.
FIELD DRAG.

No. 289,656. Patented Dec. 4, 1883.

WITNESSES:
Chas. Nida
C. Sedgwick

INVENTOR:
D. Hill
BY Munn & Co.
ATTORNEYS.

UNITED STATES PATENT OFFICE.

DANIEL HILL, OF NEW VIENNA, OHIO.

FIELD-DRAG.

SPECIFICATION forming part of Letters Patent No. 289,656, dated December 4, 1883.

Application filed August 10, 1883. (No model.)

*To all whom it may concern:*

Be it known that I, DANIEL HILL, of New Vienna, in the county of Clinton and State of Ohio, have invented a new and useful Improvement in Field-Drags, of which the following is a full, clear, and exact description.

Reference is to be had to the accompanying drawings, forming a part of this specification, in which similar letters of reference indicate corresponding parts in all the figures.

Figure 1:
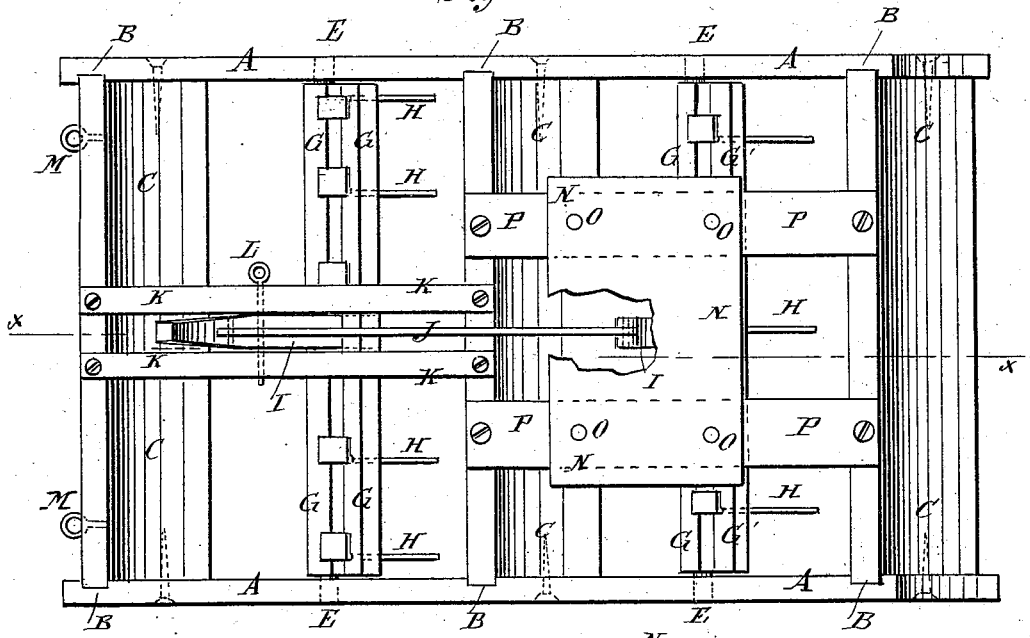
Figure 2:
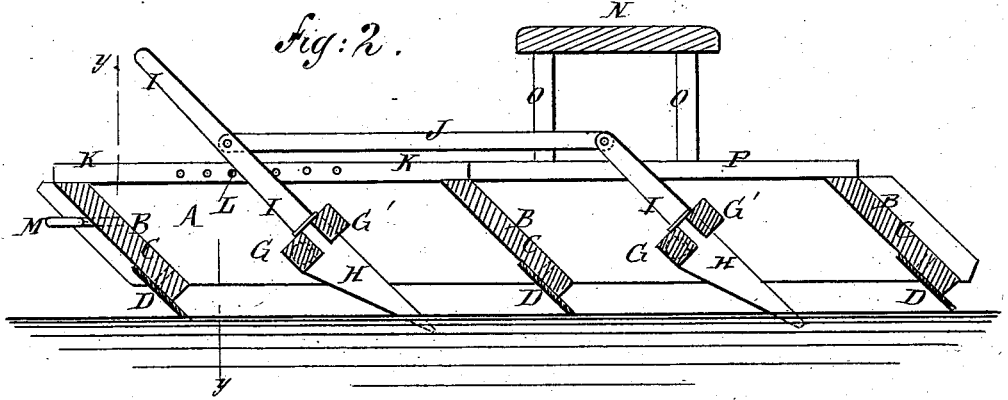
Figure 3:
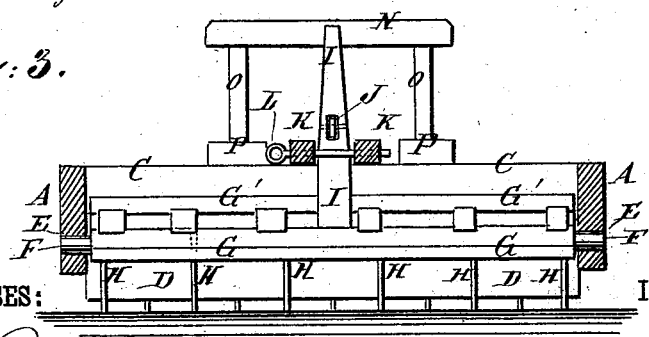

Figure 1 is a plan view of my improvement, part being broken away. Fig. 2 is a sectional side elevation of the same, taken through the line $x\,x$, Fig. 1. Fig. 3 is a sectional front elevation of the same, taken through the line $y\,y$, Fig. 2.

The object of this invention is to facilitate the pulverizing and leveling of soil in preparing the said soil to receive seed.

A represents the side boards of the machine, which may be of any desired length, breadth, and thickness. The forward ends of the boards A are beveled upon the lower side, and their rear ends are beveled upon the upper side, as shown in Fig. 2. In the inner sides of the side boards, A, near their ends and at their centers, are formed inclined grooves B, into which are fitted the ends of cross-boards C. The cross-boards C are secured in place by bolts, which pass through the side boards, A, and into nuts embedded near the ends of the cross-boards C, or by other suitable means. To the lower part of the forward sides of the cross-boards C are secured, by screws, bolts, or other suitable means, steel plates D, which project a little below the lower edge of the said cross-boards to act upon the soil. In the side boards, A, between the cross-boards C, are formed holes E, to receive journals F, formed upon the ends of cross-bars G, to which are attached the shanks of the steel knives H. The shanks of the knives H can be inserted in grooves in the adjacent faces of the cross-bars G and of bars G', bolted to the said cross-bars or secured by other suitable means, and can be kept from slipping downward by heads formed upon the ends of the said shanks. The knives H of the rear cross-bar, G, are arranged to travel midway between the cuts made by the knives of the forward cross-bar, so as to cut into small pieces the clods that have been operated upon by or have passed between the said forward knives. To the cross-bars G are attached levers I, the forward one of which is made long and the rear one short. To the upper end of the short lever I is pivoted the end of a connecting-bar, J, the forward end of which is pivoted to the middle part of the long lever I, so that the two sets of knives H can be adjusted to work at any desired depth in the ground and can be raised above the ground by operating the said long lever I. The knives H can be held in place against the resistance of the soil by a chain attached to the long lever I and hooked upon a hook or pin attached to the cross-board C in the rear of the said lever; or the long lever I can pass up between two parallel bars, K, attached to the upper edges of the first and second cross-boards C, and can be supported by a pin, L, passed through perforations in the said bars K. Several holes are formed in the bars K, to receive the pin L, so that the knives H can be supported in any desired position. The last-described arrangement is shown in the drawings. To the forward cross-board C, or to the forward ends of the side boards, A, are attached eyebolts M, hooks, or other couplings to receive the draft.

N is the driver's seat, which is attached to the upper ends of the standards O. The lower ends of the standards O are attached to two bars, P, which are nailed or otherwise secured to the upper edges of the rear and center cross-board C.

With this construction, as the machine is drawn forward, the forward scraper will partially level the soil and will push or press the clods and sods into the soil, so that the forward set of knives will cut them into pieces. The center scraper will further level the soil and pack the clods and sods, and the second set of knives will cut the said clods and sods into smaller pieces, and the soil will be leveled and smoothed by the last scraper and left in good condition for the operation of a planter or seed-drill.

I do not abandon or dedicate to the public any patentable features set forth herein and not hereinafter claimed, but reserve the right to claim the same either in a reissue of any patent that may be granted upon this application or in other applications for Letters Patent that I may make.

Having thus described my invention, I claim as new and desire to secure by Letters Patent—

The combination of the side boards, A A, having the inclined grooves B, the cross-boards C, fitting in said grooves and carrying plates D, the pivoted cross boards or bars G G', arranged between boards C and carrying between them the knives H, the pivoted rod J, connecting the levers I I, and the longitudinal bars K K, having opposite holes that receive the pin L, as shown and described.

DANIEL HILL.

Witnesses:
T. L. ROGERS,
ZADOK MILLER.